No. 681,865. Patented Sept. 3, 1901.
J. H. WALLACE & A. G. HILTON.
SASH RACK.
(Application filed June 7, 1900.)
(No Model.)

WITNESSES:
Chas. H. Luther Jr
A. E. Hagerty

INVENTORS:
James H. Wallace
Arthur G. Hilton
by Joseph A. Miller & Co.
Attys.

THE NORRIS PETERS CO., PHOTO-LITHO., WASHINGTON, D. C.

UNITED STATES PATENT OFFICE.

JAMES H. WALLACE AND ARTHUR G. HILTON, OF PROVIDENCE, RHODE ISLAND, ASSIGNORS TO THE INTERNATIONAL BURGLAR PROOF SASH-BALANCE AND LOCK COMPANY, INCORPORATED, OF SAME PLACE.

SASH-RACK.

SPECIFICATION forming part of Letters Patent No. 681,865, dated September 3, 1901.

Application filed June 7, 1900. Serial No. 19,403. (No model.)

*To all whom it may concern:*

Be it known that we, JAMES H. WALLACE and ARTHUR G. HILTON, citizens of the United States, residing at Providence, in the county of Providence and State of Rhode Island, have invented a new and useful Improvement in Window-Sash Racks, of which the following is a specification.

In using spring-balances for window-sashes a toothed gear on the spring-case engages with a rack on the window-sash. These racks require to be light and yet durable, the weight of the sash being supported on practically one tooth of the rack.

The invention consists in the peculiar and novel construction of the rack whereby the rack is strengthened and the wear on the teeth diminished, as will be more fully set forth hereinafter.

Figure 1:
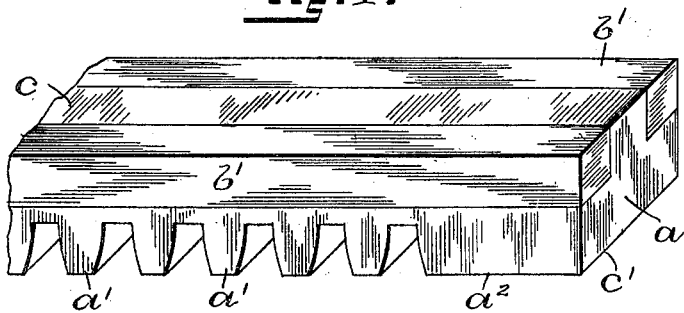
Figure 2:
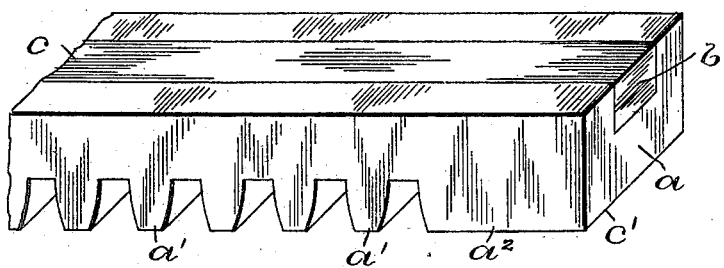
Figure 3:
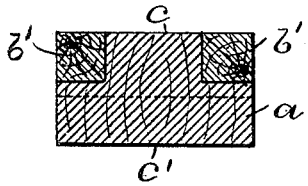
Figure 4:
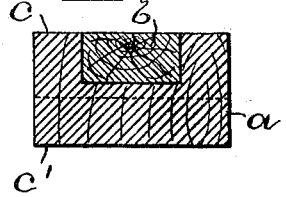

Figure 1 is a perspective view of part of a rack strengthened with two longitudinal strips. Fig. 2 is a perspective view of a modified form of the rack strengthened by means of a central longitudinal strip. Fig. 3 is a transverse sectional view of the rack shown in Fig. 1. Fig. 4 is a transverse sectional view of the modified form of rack shown in Fig. 2.

In the drawings, $a$ indicates the strip in which the teeth $a'\ a'$ are formed; $a^2$, a stop on the end of the strip $a$; $b$, a strip extending longitudinally along the center and embedded in the strip $a$, and $b'\ b'$ two longitudinal strips embedded in the strip $a$ to form the corners of the back of the strip.

These racks are usually made of wood, and to secure the required strength and durability the grain of the wood must extend transversely to the length of the strip—that is to say, from the rear surface $c$ to the front $c'$. By this disposition of the grain of the wood the gear-teeth engaging with the teeth $a'\ a'$ of the rack move lengthwise to the grain of the wood of which the teeth are formed. A rack constructed of wood cut across the grain has little longitudinal strength or stability. Such a rack secured to a sash at intervals would break in pieces in ordinary use, the thickness of the material forming the rack being limited to about twice the length of the teeth. When made of wood cut transversely to the grain, a rack of the ordinary length has to be formed of a number of pieces, and these require to be rigidly bound together to secure longitudinal strength. The racks instead of being formed in part or whole of wood may be made of ebonite, rawhide, or other material, which may be molded or otherwise formed into the toothed portion of the rack, and then strengthened by longitudinal strips of the same or any other suitable material to secure the required strength to resist the strain of the weight of the sash and the pull of the gear engaging with the rack.

Having thus described our invention, we claim as new and desire to secure by Letters Patent—

As a new article of manufacture, a rack-strip for window-sash balances formed of wood the grain of which extends transversely to the strip, having a strip of wood inserted in the back portion of the rack the grain of which extends longitudinally to the strip, as described.

In testimony whereof we have signed our names to this specification in the presence of two subscribing witnesses.

JAMES H. WALLACE.
ARTHUR G. HILTON.

Witnesses:
B. M. SIMMS,
J. A. MILLER, Jr.